May 7, 1929. H. WEICHSEL 1,712,237
ALTERNATING CURRENT MOTOR
Filed Jan. 31, 1925
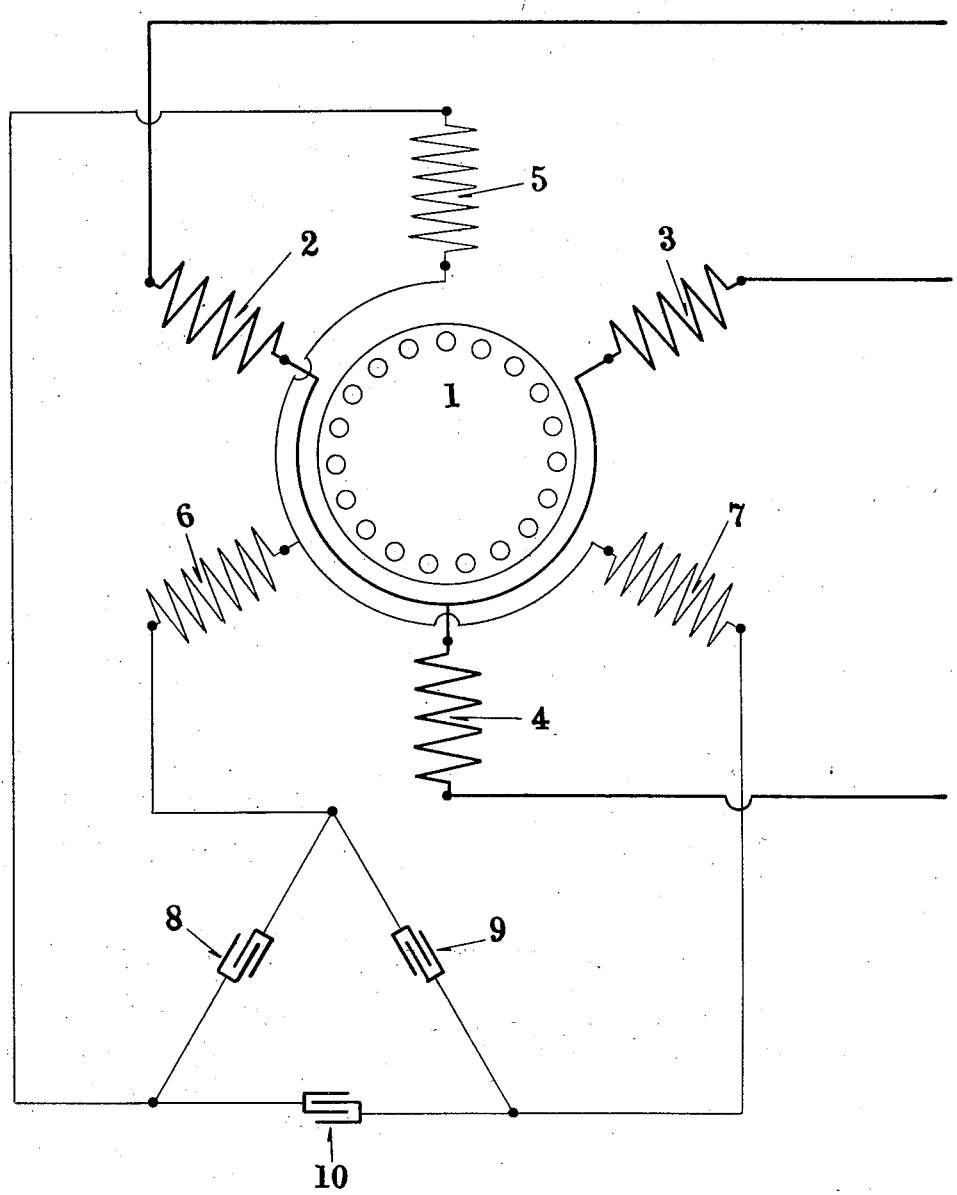

Patented May 7, 1929.

1,712,237

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed January 31, 1925. Serial No. 5,925.

My invention relates to alternating current motors of types not employing a commutator for deriving current for phase compensation, such as squirrel-cage and slip ring motors, and its object is to provide means for improving and adjusting the power factor of such machines.

According to present practice the power factor of motors of the type referred to, has been improved by either connecting a bank of static condensers parallel with the motor, or in parallel with feeder lines supplying a number of motors. The size and cost of a condenser varies inversely with the square of the voltage employed, and for this reason condensers controlling a number of motors are usually designed for approximately 2000 volts, thus requiring the use of a transformer. For the reason indicated, the cost of a condenser for an individual motor, when no transformer is employed, is high in proportion to the cost of the motor itself.

My invention, comprising means embodied in the motor for improvement of power factor, has the advantage of accomplishing the result desired in a less expensive manner than by using a separate condenser for each motor as above referred to, and also obvious operating advantages over the present practice of using a transformer and a single condenser in association with a number of motors.

The accompanying drawing diagrammatically illustrates a motor embodying my invention. 1 represents the rotor provided with a squirrel-cage winding, and 2, 3 and 4 the phases of the main inducing winding on the stator supplied with line current from the mains. The stator is also provided with an auxiliary polyphase winding 5, 6, 7 having preferably a considerably larger number of turns than the winding 2, 3, 4, and located in transformer relation with said winding and preferably in the same winding slots. The phases of this auxiliary winding are interconnected by means of condensers 8, 9 and 10, and as shown these condensers are preferably connected in delta.

With the arrangement described, the condenser value, and therefore magnitude of the leading current in the auxiliary winding, can be so adjusted as to cause the motor to have any desired power factor at a given load. By making the transformation ratio between the main and auxiliary windings relatively high, the size and cost of the condensers may be decreased. These condensers may be unitary with the motor and mounted, for example, in the base thereof, and the connections between the condensers and auxiliary winding be wholly enclosed, thus avoiding exposing any high tension conductors.

It will be noted that my invention provides a self-compensated induction motor in which the compensation is secured in a less expensive and more convenient manner than achieved in prior practice.

Having fully described my invention, what I claim as new and desire to secure by Letters Patent of the United States is:

1. In an alternating current motor, the combination of an induced member, an inducing member provided with a polyphase inducing winding adapted for connection to a polyphase source, and a closed compensating circuit comprising a capacity and an auxiliary winding on the inducing member in good inductive relation to a phase of the inducing winding and conductively independent from other phases of said winding, said auxiliary winding being so dimensioned that the voltage across the capacity will substantially exceed the line voltage and the value of the capacity being such that the motor will operate with substantially unity power factor at full load.

2. In an alternating current motor, the combination of an induced member, an inducing member provided with a polyphase inducing winding adapted for connection to a polyphase source and with a compensating polyphase auxiliary winding in good inductive relation with the inducing winding and having a greater number of turns than said winding, each phase of the auxiliary winding being conductively independent of non-corresponding phases of the inducing winding, and capacity means in circuit with said auxiliary winding.

In testimony whereof, I have hereunto set my hand this 26th day of January, 1925.

HANS WEICHSEL.